March 29, 1955  M. WEBER  2,705,296
FUEL CONTROL APPARATUS
Filed April 1, 1952
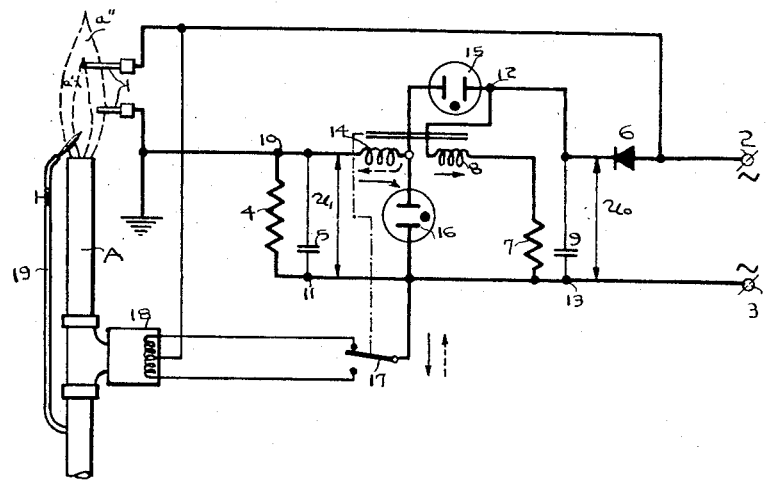
INVENTOR:
MAX WEBER
BY Morgan, Finnegan & Durham
ATTORNEYS

United States Patent Office 2,705,296
Patented Mar. 29, 1955

2,705,296

FUEL CONTROL APPARATUS

Max Weber, Hedingen, Zurich, Switzerland, assignor to Landis & Gyr, A. G., a body corporate of Switzerland Application April 1, 1952, Serial No. 279,881

Claims priority, application Switzerland April 5, 1951

2 Claims. (Cl. 317—132)

The present invention relates to fuel control apparatus especially adapted to be used in combustion plants using non-luminous flames.

Objects and advantages of the invention will be set forth in part hereinafter and in part will be obvious herefrom, or may be learned by practice with the invention, the same being realized and attained by means of the apparatus pointed out in the appended claims.

The invention consists in the novel apparatus and improvements herein shown and described.

An object of the present invention is to provide novel fuel control apparatus for automatically interrupting the supply of fuel to a combustion plant on the near or full extinction of the principal burning flame due to an abnormal operation of said plant.

A further object of my invention is to provide novel control apparatus for combustion plants which produces a light signal when the flame of said plant is nearly or fully extinguished so as to provide warning means that the plant is not operating properly.

The accompanying drawings, referred to herein and constituting a part hereof, illustrate one embodiment of the invention, and together with the description, serve to explain the principles of the invention.

The figure illustrated is a diagrammatic view of an embodiment of my invention.

In combustion plants, especially those using non-luminous flames which are not readily visible such as methane or hydrogen, it is necessary to have some control means of shutting off the fuel supply to the plant once the flame has been nearly or fully extinguished due to the faulty operation of the plant. Such a control means is necessary not only to insure against explosions but also to avoid waste of expensive fuel. The present invention is directed to such a control apparatus as now described in detail with reference to the drawing.

In accordance with the invention, a detector or ionization segment 1 consisting of two electrodes, is connected directly to a terminal 2 and to a terminal 3 by means of resistor 4; an alternating voltage being applied to said terminals 2 and 3. The electrode of detector 1, which has a comparatively large surface, projects into a comparatively cold core $a'$ of a flame produced by burner A while the other electrode, which has a comparatively small surface, dips into the hot part $a''$ of the flame produced by said burner. As the ionization is greater in the hotter marginal region of the flame than in the cold core, a rectifier effect appears on the ionization segment when it is connected to the alternating voltage. If the flame becomes shorter so that one of the electrodes no longer extends into the flame or if the flame disappears, said rectifier effect disappears immediately. When the flame is burning a direct current flows through the detector 1 which acts as a rectifier, the direct current being formed by one part of the semi-waves of the alternating current flowing to the detector 1. The direct current is smoothed by means of a capacitor 5 and produces in the resistor 4 a direct current voltage drop $U_1$. By means of a rectifier arrangement, also connected to the terminals 2, 3, consisting of a dry rectifier 6, a pre-excitation relay winding 8 arranged in series with a resistor 7 and in parallel with a smoothing capacitor 9, a fixed direct voltage $U_0$ is produced. The direct voltage $U_1$ appearing at the points 10, 11 is compared with the fixed direct voltage $U_0$ which is present at the points 12, 13, by means of a relay winding 14 connected in series between the points 10, 12 and a gaseous conduction tube or glim lamp 15. Another gaseous conduction tube or glim lamp 16 is connected in parallel to the resistor 4 in such a way as to be in series with the relay winding 14. The relay windings 8 and 14 are arranged on one and the same core and control a reversing switch 17. The entire construction is arranged as a polarized relay, i. e., the reversing switch 17 is shifted by the relay winding 14 in either reversing position according to the direction of the current and remains in each case in one of these positions. During operation a constant current flows through the relay winding 8 and produces a superposed magnetization of the relay. The excitation of the relay winding 8 is so proportioned that the relay armature in both reversing positions produces exactly the same contact pressure. Without this excitation the magnetic effects on the relay armature change in such a manner that the latter shifts the reversing switch 17 into the position of rest, as, for example, in the case of voltage interruption.

The mode of operation of the described embodiments of control apparatus will now be described. In the initial position, the reversing switch 17 is in the position of rest as shown in the drawing and the valve 18 controlled by means of it in the fuel line is closed. When the combustion plant is started, the flame control supply line receives alternating voltage and the fixed direct voltage $U_0$ is produced at once. The basic excitation of the polarized relay is produced by the direct current flowing across the relay winding 8. If the flame is already ignited, in which case the fuel is supplied by way of an alternative line 19 to be operated temporarily, the direct voltage $U_1$ is also produced immediately. This ignites the glim lamp 16 and the capacitor 5 is discharged by impulses across the relay winding 14 and the glim limp 16 with a current flowing in the direction of the arrow drawn in solid line. The consequence of this is that the reversing switch 17 switches downwardly to the operating position, which opens the fuel valve 18. If for any reason the flame should not yet be ignited the direct voltage $U_1$ does not appear and the direct voltage $U_0$ acting on the glim lamp 15 ignites said lamp. In that case a current flows through the relay winding 14 in the direction of the arrow drawn in a broken line, which however, does not actuate the reversing switch 17 as the latter is still in the position of rest, i. e. in that position in which it would be switched by the current now flowing through the relay winding. Thus the fuel supply valve 18 is not released in this case.

If the combustion plant is operating normally a difference of potential obtains between the points 10 and 12 in consequence of the direct voltages $U_1$ and $U_0$ which are present simultaneously and act against each other, which difference of potential is smaller than the ignition voltage of the glim lamp 15. An intermittent functioning of the glim lamp 16 caused by a sufficiently great direct voltage $U_1$ has no further consequences as the reversing switch 17 would thereby be switched only to the already occupied operating position. But if the flame is shortened, for example, on account of a deficient fuel supply, or if it is extinguished entirely, the direct voltage $U_1$ disappears and the full direct voltage $U_0$ prevails at the glim lamp 15 which causes the latter to be ignited. Across the relay winding 14 there now flows a current in the direction of the current shown in broken line, the consequence being the reversal of the switch 17 to the position of rest indicated and the closure of the fuel supply valve 18. If the network voltage fails during normal operation the basic excitation of the polarized relay produced by the relay winding 8 is abolished and the reversing switch 17 is likewise switched back to the position of rest and the fuel supply is turned off.

If after lengthy operation and deficient maintenance a shunt resistance should form through the accumulation of soot, oil or the formation of water of condensation, etc., between the two electrodes of the detector 1, the rectifying effect can no longer be produced and at the resistor 4 there appears an alternating voltage drop instead of a direct voltage drop. At the first zero passage of this alternating voltage the full direct voltage $U_0$ prevails again on the glim lamp 15 and ignites it, the consequence of which is again the return of the reversing switch 17 to its position of rest and thus the interruption of the fuel supply. This forms a special advantage of the present arrangement. Obviously the flame control arrangement described can also be used to control a so-called pilot light instead of a principal flame. If in this case the pilot light controlling the principal flame is extinguished so that there is no guarantee that when fuel is again supplied to the principal flame the latter will be ignited again by the pilot light, the flame control described blocks the entire fuel supply. As is usual in oil burning plants means can of course be used such as thermic switches, time mechanisms, etc. which automatically restart a stopped plant after a short or long interruption. If these attempts at restarting are unsuccessful the plant is finally brought to shutdown position.

The invention in its broader aspects is not limited to the specific apparatus shown and described but departures may be made therefrom within the scope of the accompanying claims without departing from the principles of the invention and without sacrificing its chief advantages.

I claim:

1. A fuel control apparatus adapted to be used in combination with a combustion plant having a burner for producing a burning flame, comprising a detector having an electrode for insertion into a hot region of the flame produced by said burner and a second electrode for insertion into a cold region of the flame produced by said burner, said detector being connected to an alternating voltage by means of an operating circuit, said circuit including a resistor connected in series to said detector on alternating current, an exciter relay winding connected in series with said resistor, and a first gaseous conduction tube connected in series with said exciter relay winding; a second gaseous conduction tube in series with said exciter relay winding and in series with a rectifier of a rectifier arrangement comprising said rectifier, a loading capacitor in parallel with said resistor, and a pre-excitation relay winding in parallel with said capacitor; said exciter relay winding being excited by impulses by means of the discharging current of said capacitor flowing across said first gaseous conduction tube, and said pre-excitation relay being continuously excited by a fixed direct voltage produced by said rectifier arrangement; said second gaseous conduction tube being ignited by said fixed direct voltage, provided there is no current produced at said resistor and said first gaseous conduction tube being ignited when a direct current drop takes place in said resistor.

2. An apparatus as defined in claim 1 wherein the exciter relay and pre-excitation relay are fixed on a common core.

References Cited in the file of this patent

UNITED STATES PATENTS

| | | |
|---|---|---|
| 2,074,637 | Ballentine | Mar. 23, 1937 |
| 2,112,736 | Cockrell | Mar. 29, 1938 |
| 2,539,208 | Schultz et al. | Jan. 23, 1951 |
| 2,556,961 | Feigal | June 12, 1951 |
| 2,610,677 | Lange | Sept. 16, 1952 |